US012790193B2

(12) United States Patent
McGraw et al.

(10) Patent No.: US 12,790,193 B2
(45) Date of Patent: Nov. 10, 2026

(54) SADDLE AND REMOVABLE EXTENSION FOR A FLOOR JACK WITH STORAGE ASSEMBLY

(71) Applicant: Harbor Freight Tools USA, Inc., Calabasas, CA (US)

(72) Inventors: Andrew Francis McGraw, Newbury Park, CA (US); Casper Wypych, Calabasas, CA (US)

(73) Assignee: Harbor Freight Tools USA, Inc., Calabasas, CA (US)

(*) Notice: Subject to any disclaimer, the term of this patent is extended or adjusted under 35 U.S.C. 154(b) by 321 days.

(21) Appl. No.: 18/422,526

(22) Filed: Jan. 25, 2024

(65) Prior Publication Data

US 2025/0002313 A1 Jan. 2, 2025

Related U.S. Application Data

(63) Continuation-in-part of application No. 18/215,506, filed on Jun. 28, 2023, now Pat. No. 12,595,162.

(51) Int. Cl.
*B66F 13/00* (2006.01)
*B66F 5/04* (2006.01)

(52) U.S. Cl.
CPC ................ *B66F 13/00* (2013.01); *B66F 5/04* (2013.01)

(58) Field of Classification Search
CPC ..... B66F 13/00; B66F 5/00–04; Y10S 254/04
See application file for complete search history.

(56) References Cited

U.S. PATENT DOCUMENTS 2,748,459 A * 6/1956 Orr ...................... B25H 1/0007 269/296
4,640,495 A * 2/1987 Parsons ..................... B66F 5/04 254/8 B
4,964,617 A 10/1990 Lawrence
(Continued)

FOREIGN PATENT DOCUMENTS

CN 205575450 9/2016
CN 205892632 1/2017
(Continued)

OTHER PUBLICATIONS

Floor Jack Extension, <https://martinsindustries.com/int_en/floor-jack-extension-mfj-e>, 2023.
(Continued)

*Primary Examiner* — Tyrone V Hall, Jr.
(74) *Attorney, Agent, or Firm* — McAndrews, Held & Malloy, Ltd.

(57) ABSTRACT

A saddle and removable extension for a floor jack having a storage assembly is disclosed. A saddle and extension assembly of the floor jack includes a jack saddle fastened to a mounting bracket of a lifting arm and an extension having a flange and an extension saddle. To withstand off-center loading conditions when the floor jack is in an upper extended position, at least one extension fastener is operable to engage with at least one extension bore by fastening the extension to the jack saddle and the mounting bracket of the lifting arm. A storage assembly is provided on a body of the floor jack to house the extension during storage or transport.

4 Claims, 14 Drawing Sheets

(56) References Cited

U.S. PATENT DOCUMENTS

| | | | |
|---|---|---|---|
| 9,022,356 | B2 | 5/2015 | Flournoy et al. |
| 2019/0169004 | A1 | 6/2019 | Su et al. |
| 2024/0336459 | A1 | 10/2024 | Su et al. |

FOREIGN PATENT DOCUMENTS

| | | |
|---|---|---|
| CN | 217756684 | 11/2022 |
| CN | 217756685 | 11/2022 |
| CN | 217756688 | 11/2022 |
| CN | 218261742 | 1/2023 |
| CN | 220012065 | 11/2023 |

OTHER PUBLICATIONS

3 Ton Big Wheel Off Road Jack "Kratos", <https://www.proeagle.com/products/3-ton-big-wheel-jack-kratos>, 2023.

* cited by examiner

SADDLE AND REMOVABLE EXTENSION FOR A FLOOR JACK WITH STORAGE ASSEMBLY

CROSS-REFERENCE TO RELATED APPLICATION

The present application is a continuation-in-part of co-pending, commonly assigned, patent application Ser. No. 18/215,506 entitled "Saddle and Removable Extension for a Floor Jack with Storage Assembly," filed Jun. 28, 2023, the disclosure of which is hereby incorporated by reference in its entirety.

BACKGROUND

The present disclosure relates generally to a saddle and removable extension for a floor jack having a storage assembly.

Traditional floor jacks include a saddle positioned on a mounting bracket of a lifting arm to contact a suitable lifting point on a vehicle. The maximum lift height of a floor jack is dependent on factors such as the length of the lifting arm, the degree of rotation at the pivot point of the lifting arm, and the height of the jack. For vehicles with lower ground clearance, only a small lift height may be necessary to lift a vehicle. For cars, trucks, ATVs, UTVs, or other vehicles with a higher ground clearance, an extension is often necessary to achieve a higher lift height.

However, the added height of an extension disposed on a saddle makes the extension susceptible to tilting and deflection when exposed to off-center (eccentric) loading conditions. Additionally, a loose fit between the saddle and the extension may result in slippage or failure under such conditions. For example, existing saddle and extension configurations that are not adequately secured to the mounting bracket or that permit axial, lateral, or rotational movement may fail industry-specific safety standards for off-center loading tests. It is therefore advantageous to improve the stability of a saddle and extension assembly for a floor jack to withstand off-center loading conditions when lifting a vehicle with higher ground clearance.

Although a stabilized saddle and extension assembly solves the problem off-center loading, the size and positioning of an extension disposed on a saddle may be too large or obtrusive for storage. It is therefore advantageous for a floor jack to include a removable extension and a storage assembly for housing the extension during storage or transport.

SUMMARY

A saddle and removable extension for a floor jack having a storage assembly is disclosed, as illustrated by and described in connection with the figures of the present disclosure, and as set forth in the claims.

Specifically, disclosed is an example saddle and extension assembly for a floor jack. The saddle and extension assembly includes a jack saddle fastened to a mounting bracket of a lifting arm. The saddle and extension assembly further includes an extension including a flange and an extension saddle. The saddle and extension assembly further includes at least one extension bore, formed off-center a central axis of the extension and the jack saddle and including a threaded portion. The saddle and extension assembly further includes at least one extension fastener operable to engage with the at least one extension bore to fasten the extension to the jack saddle.

In one example, the saddle and extension assembly includes a saddle bore, formed about the central axis and including a non-threaded portion bored through the jack saddle and a threaded portion bored at least partially into the mounting bracket. The saddle and extension assembly further includes a saddle fastener operable to engage with the saddle bore to mount the saddle to the mounting bracket of the lift arm. In another example, the at least one extension bore comprises a first extension bore and a second extension bore and the at least one extension fastener comprises a first extension fastener and a second extension fastener.

In another example, the extension includes a raised face on a bottom portion of the flange. In another example, the jack saddle includes a recess operable to receive the raised face of the flange. In an additional example, the jack saddle includes a circumferential saddle ridge and a plurality of landings disposed on the circumferential saddle ridge.

In another example, the flange further comprises a first telescoping member and the extension saddle further comprises a second telescoping member, wherein the second telescoping member is operable to be received in the first telescoping member of the flange. In another example, the extension further comprises a height adjustment mechanism, operable to adjust a height and a rotation of the extension saddle relative to the flange. In an additional example, the height adjustment mechanism comprises a pin operable to engage with one or more holes formed in the first telescoping member of the flange and the second telescoping member of the extension saddle to fix the height and the rotation of the extension saddle relative to the flange.

In another example, the jack saddle includes a jack saddle pad and the extension saddle includes an extension saddle pad.

Also disclosed is an example floor jack. The floor jack includes a body. The floor jack further includes a lifting arm pivotally connected to the body operable to move between an upper extended position and a lower retracted position. The floor jack further includes a mounting bracket pivotally connected to an end of the lifting arm. The floor jack further includes a mounting bracket pivotally connected to an end of the lifting arm. The floor jack further includes a jack saddle fastened to the mounting bracket. The floor jack further includes a removable extension, including a flange, an extension saddle, and a shaft disposed between the flange and the extension saddle. The floor jack further includes at least one extension bore, including a threaded portion. The floor jack further includes at least one extension fastener operable to engage with the at least one extension bore to fasten the removable extension to the jack saddle in an extension configuration. The floor jack further includes a storage assembly, operable to store the removable extension on the body in a stored configuration.

In one example, the storage assembly includes at least one notch formed into a side of the body and a storage clamp bracket mounted on the body, wherein the at least one notch is operable to receive a portion of the at least one extension fastener. In another example, the storage clamp bracket is operable to releasably secure the removable extension.

In another example, the storage assembly further comprises a storage fastener and the removable extension includes at least one threaded storage bore formed centrally on the flange, wherein the storage fastener is operable to engage with the at least one threaded storage bore to releasably secure the removable extension to the body. In another example, the at least one threaded storage bore comprises a first threaded storage bore formed off-center a central axis of the flange and a second threaded storage bore formed off-center the central axis of the flange. The storage assembly further comprises a storage fastener operable to engage either the first threaded storage bore or the second threaded storage bore to releasably secure the removable extension to the body. In an additional example, the removable extension is positioned generally horizontally in the stored configuration and is positioned generally vertically in the extension configuration.

In another example, the floor jack includes a saddle bore, formed centrally on the saddle and including a non-threaded portion bored through the jack saddle and a threaded portion bored at least partially into the mounting bracket. The floor jack further includes a saddle fastener operable to engage with the saddle bore to fasten the saddle to the mounting bracket of the lift arm. In another example, the at least one extension bore comprises a first extension bore and a second extension bore and the at least one extension fastener comprises a first extension fastener and a second extension fastener.

In another example, the removable extension includes a raised face on a bottom portion of the flange. In another example, the jack saddle includes a recess operable to receive the raised face of the flange. In an additional example, the jack saddle includes a circumferential saddle ridge and a plurality of landings disposed on the circumferential saddle ridge. In an additional example, the removable extension further comprises a height adjustment mechanism, operable to adjust a length and a rotation of the shaft.

Also disclosed is an example method of attaching an extension assembly and extension saddle onto a floor jack. The method includes providing a floor jack with a mounting bracket, the mounting bracket pivotally coupled to an end of a lifting arm of the floor jack. The method further includes providing a jack saddle mounted to the mounting bracket. The method further includes providing an extension. The method further includes placing the extension onto the jack saddle. The method further includes aligning at least one extension bore. The method further includes providing at least one extension fastener. The method further includes inserting the at least one extension fastener into the at least one extension bore.

In one example, the at least one extension bore comprises a first extension bore and a second extension bore and the at least one extension fastener comprises a first extension fastener and a second extension fastener. The method further includes inserting the first extension fastener into the first extension bore and engaging the first extension fastener with a threaded portion of the first extension bore. The method further includes inserting the second extension fastener into the second extension bore and engaging the second extension fastener with a threaded portion of the second extension bore.

In another example, the method includes adjusting a height-adjustment mechanism on the extension, the height adjustment mechanism being operable to adjust a height and a rotation of the extension saddle relative to a flange. In another example, the method includes removing the extension from a storage assembly, the storage assembly operable to store the extension on a body of the floor jack in a stored configuration. In an addition example, the method includes returning the extension to the stored configuration after use.

Figure 1:
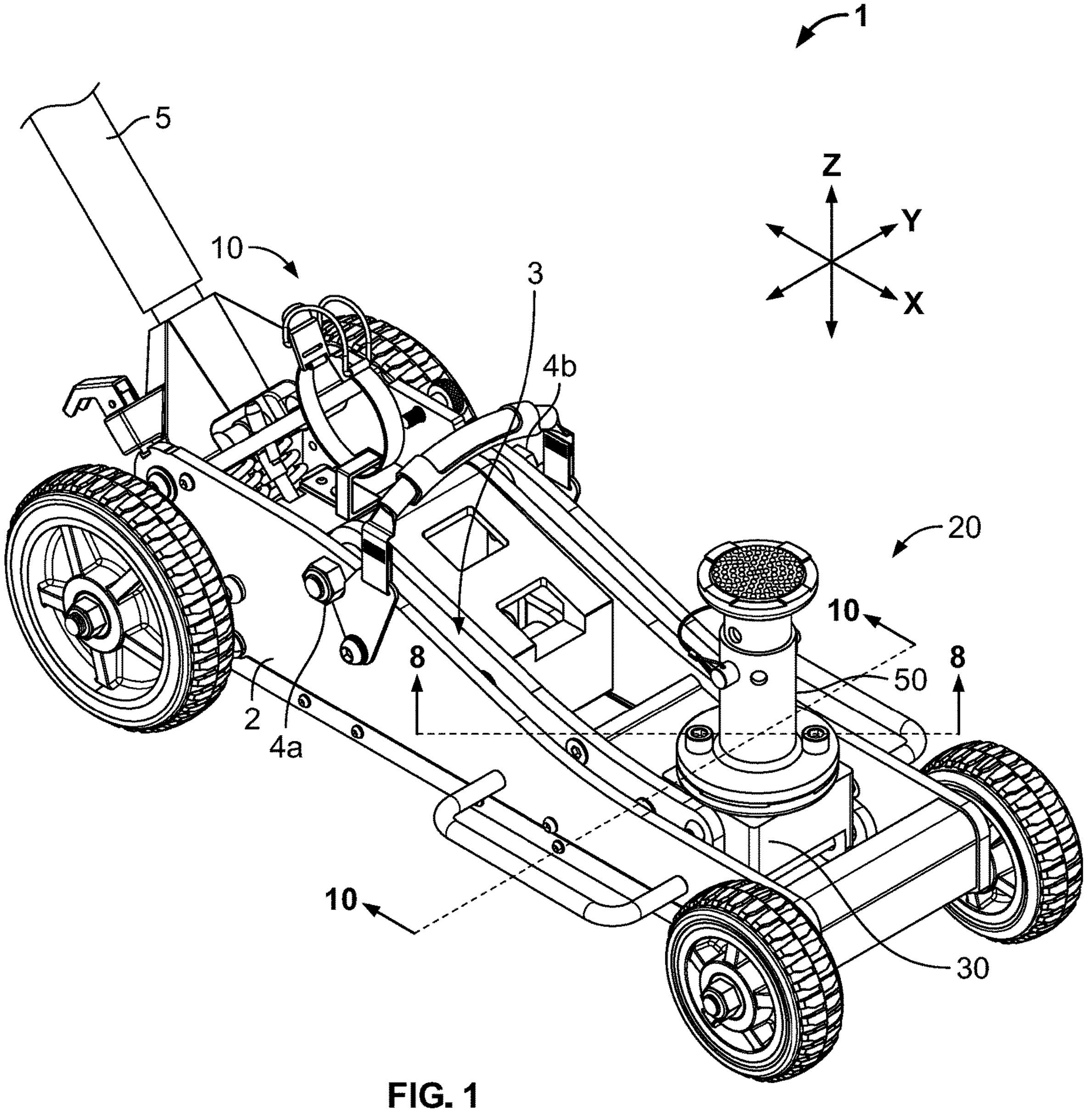
FIG. 1 illustrates a perspective view of an assembled saddle and extension assembly in an extension configuration according to one aspect of the present disclosure.

The foregoing summary, as well as the following detailed description of certain features of the present application, are better understood when read in conjunction with the appended drawings. For the purposes of illustration, certain features are shown in the drawings. It should be understood, however, that the claims are not limited to the arrangements shown in the attached drawings. Although specific features of various embodiments may be shown in some drawings and not in others, this is for convenience only. Any feature of any drawing may be referenced and/or claimed in combination with any feature of any other drawing.

Unless otherwise indicated, the drawings provided herein are meant to illustrate features of embodiments of the disclosure. These features are believed to be applicable in a wide variety of applications comprising one or more embodiments of the disclosure. As such, the drawings are not meant to include all conventional features known by those of ordinary skill in the art to be required for the practice of the embodiments disclosed herein.

DETAILED DESCRIPTION

FIG. 1 shows an assembled view of a saddle and extension assembly 20 for a floor jack 1 having a storage assembly 10. Also shown in FIG. 1 are x, y, and z-axes to assist in the description of the various movements and relationships of the components of the floor jack 1. The floor jack 1 includes a body 2 and a lifting arm 3 pivotally connected to the body 2 at pivot points 4*a* and 4*b*. A handle 5 is provided to actuate rotation of the lifting arm 3 along a rotation axis extending through pivot points 4*a* and 4*b*, thereby selectively raising and lowering the distal end 6 of the lifting arm 3 along the z-axis between a lower retracted position (shown in FIG. 1) and an upper extended position (shown in FIG. 2). Also shown are two different cross sections of the saddle and extension assembly 20 taken at line (8-8) and (10-10).

Figure 2:
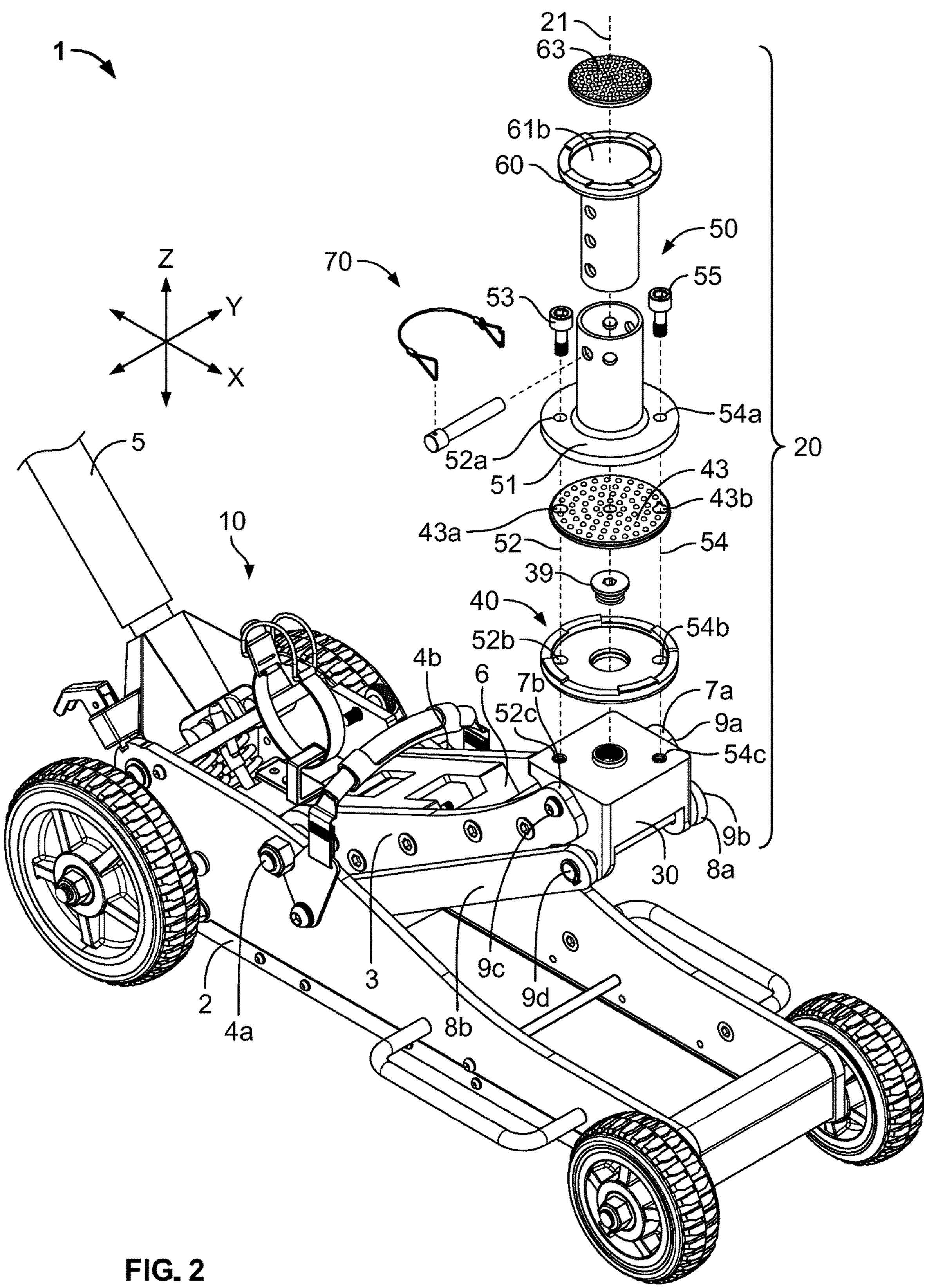
FIG. 2 illustrates an exploded perspective view of a floor jack according to one aspect of the present disclosure.

FIG. 2 shows an exploded view of a saddle and extension assembly 20 for a floor jack 1. As shown, the lifting arm 3 of floor jack 1 includes the end 6 with legs 7*a* and 7*b* and lateral linkages 8*a* and 8*b* configured to actuate elevation of the mounting bracket 30 at pivot points 9*a*, 9*b*, 9*c*, and 9*d*. As such, the mounting bracket 30 is pivotally connected to the end 6 of the lifting arm 3 and disposed between the legs 7*a* and 7*b* and lateral linkages 8*a* and 8*b*.

The saddle and extension assembly 20 includes a jack saddle 40 and an extension 50 that further includes a flange 51 and an extension saddle 60. The extension 50 has a predetermined length suitable for providing additional lift height when fastened to jack 1. The extension 50 and the jack saddle 40 are fastened to the mounting bracket 30 of the lifting arm 3 with saddle fastener 39 and at least one extension fastener 53, 55. In particular, the jack saddle 40 is loosely mounted to the mounting bracket 30 with saddle fastener 39. Saddle fastener 39 substantially limits the movement of jack saddle 40 to a rotational range about a longitudinal axis of saddle fastener 39 while still permitting small, limited movement along the x, y, and z axes. The at least one extension fastener 53, 55 further secures jack saddle 40 to the extension 50, and in some embodiments, to the mounting bracket 30. The at least one extension fastener 53, 55 and the saddle fastener 39 may for example be a threaded fastener such as a bolt. As shown in FIG. 2, the at least one extension fastener 53, 55 is partially threaded and further includes a threaded portion and a smooth shank beneath a head. In alternative embodiments, the at least one extension fastener 53, 55 may be a threaded fastener extending from the flange 51 to the mounting bracket 30. In an alternative embodiment shown in FIG. 3, the at least one extension fastener 53', 55' is fully threaded. In additional alternative embodiments, the at least one extension fastener 53', 55' may include non-threaded portions extending from the flange 51 to jack saddle 40. In the preferred embodiment, at least one extension fastener 53, 55 is operable to engage with at least one extension bore 52, 54 to fasten the extension 50 to the jack saddle 40 and the mounting bracket 30 of the lifting arm 3. In an alternative embodiment, at least one extension fastener 53', 55' is operable to engage with at least one extension bore 52, 54 to fasten the extension 50 to the jack saddle 40. Further, a saddle pad 43 is disposed between the jack saddle 40 and the flange 51 for tight-fit engagement. The saddle pad 43 further includes a first pad aperture 43*a*, a second pad aperture 43*b*, and a middle pad aperture 43*c*.

The at least one extension bore 52, 54 is formed off-center a central axis 21 of the extension 50 and the jack saddle 40 and includes a non-threaded portion bored through the flange 51 and the jack saddle 40, and a threaded portion bored at least partially into the mounting bracket 30. In the illustrated embodiment shown in FIGS. 2 and 8, the at least one extension bore comprises a first extension bore 52 operable to receive a first extension fastener 53 and a second extension bore 54 operable to receive a second extension fastener 55. The first extension bore 52 includes a first non-threaded flange bore 52*a*, a first non-threaded saddle bore 52*b*, and a first threaded mounting bracket bore 52*c*. The second extension bore 54 includes a second non-threaded flange bore 54*a*, a second non-threaded saddle bore 54*b*, and a second threaded mounting bracket bore 54*c*. The extension 50 is fastened to the jack saddle 40 and the mounting bracket 30 by inserting the first extension fastener 53 through the first non-threaded flange bore 52*a*, the first pad aperture 43*a*, the first non-threaded saddle bore 52*b*, and at least partially threading the first extension fastener 53 into the first threaded mounting bracket bore 52*c*. Likewise, the second extension fastener 55 is inserted through the second non-threaded flange bore 54*a*, the second pad aperture 43*b*, the second non-threaded saddle bore 54*b*, and is at least partially threaded into the second threaded mounting bracket bore 54*c*. In another embodiment, extension fasteners 53 and 55 are fully threaded. It is to be understood that the present disclosure contemplates the first extension bore 52 and second extension bore 54 being fully threaded or partially threaded. It is also to be understood that the present disclosure contemplates flange bores 52*a*, 54*b*, saddle bores 52*b*, 54*b*, and mounting bracket bores 52*c*, 54*c* being fully threaded or non-threaded.

Figure 3:
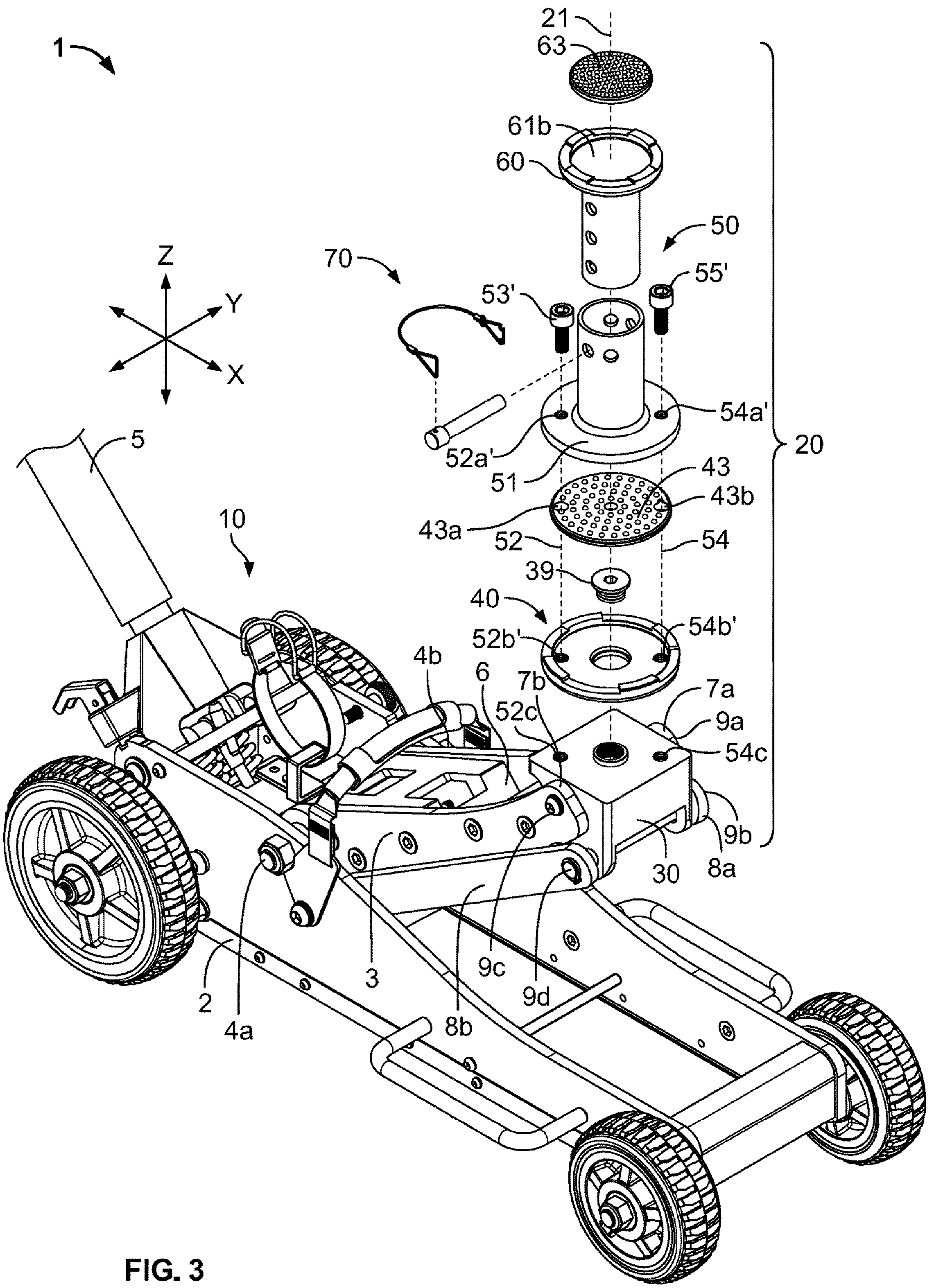
FIG. 3 illustrates an exploded perspective view of a floor jack according to another aspect of the present disclosure.
Figure 8:
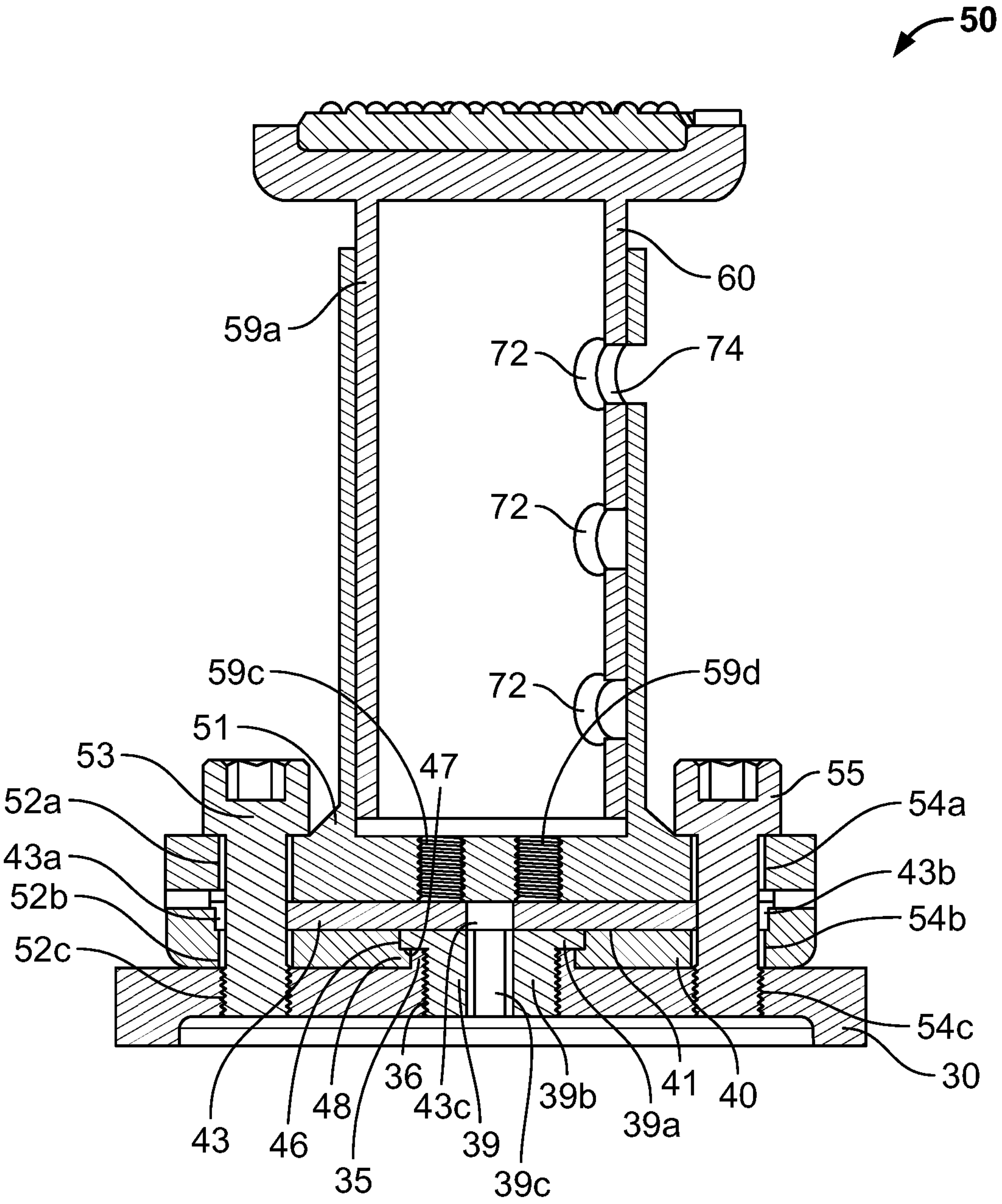
FIG. 8 illustrates a cross-sectional view of an assembled saddle and extension assembly according to one aspect of the present disclosure taken along lines 8-8 of FIG. 1.
Figure 9:
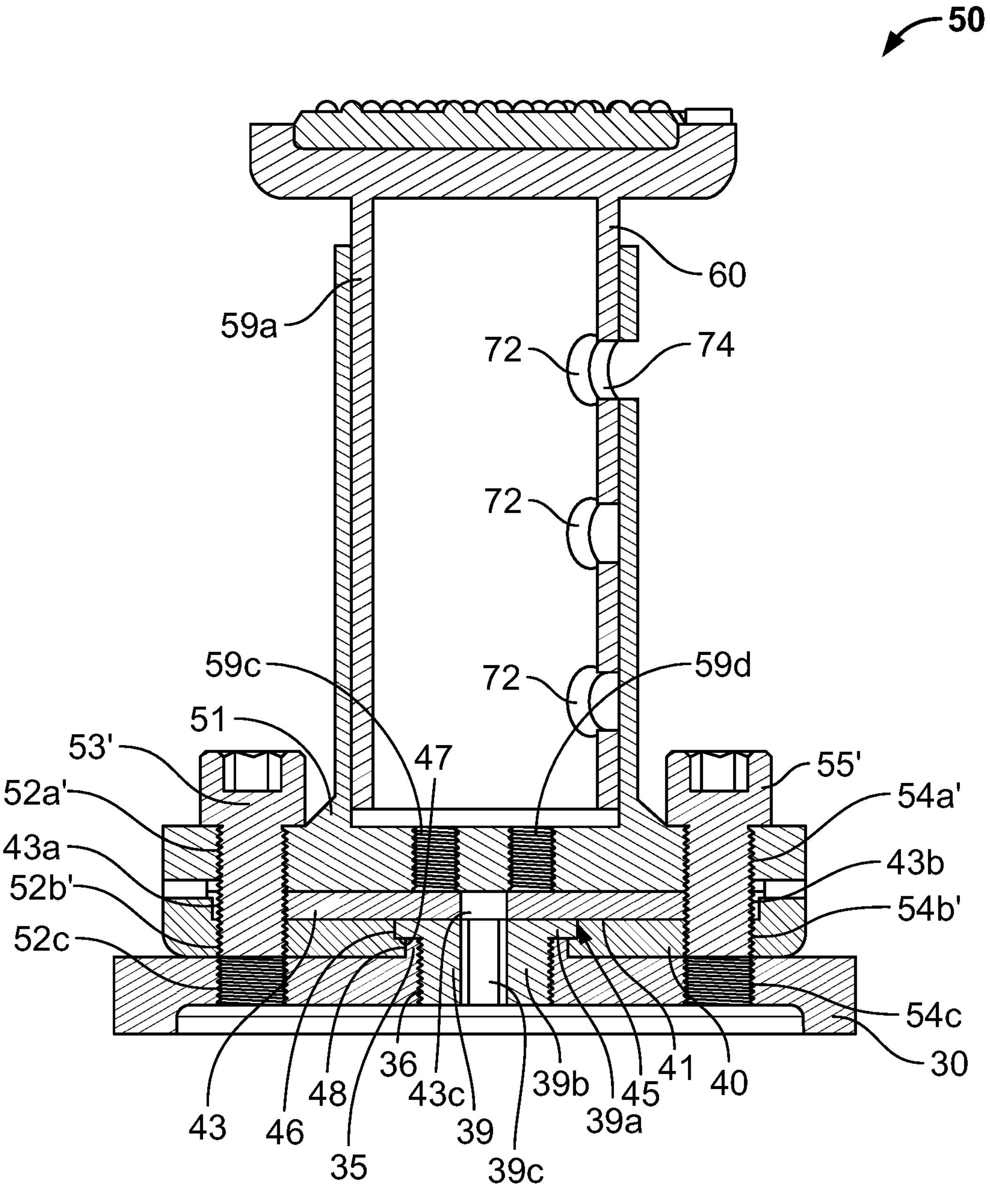
FIG. 9 illustrates a cross-sectional view of an assembled saddle and extension assembly according to another aspect of the present disclosure.

In an alternative embodiment, the at least one extension bore 52, 54 is formed off-center the central axis 21 of the extension 50 and the jack saddle 40 and includes a threaded portion bored at least partially through the flange 51 and/or the jack saddle 40. In the illustrated embodiment shown in FIGS. 3 and 9, the at least one extension bore comprises a first extension bore 52 operable to receive a first extension fastener 53' and a second extension bore 54 operable to receive a second extension fastener 55'. The first extension bore 52 includes a first threaded flange bore 52*a'* and a first threaded saddle bore 52*b'*, and optionally, a first threaded mounting bracket bore 52*c*. The second extension bore 54 includes a second threaded flange bore 54*a'* and a second threaded saddle bore 54*b'*, and optionally, a second threaded mounting bracket bore 54*c*. In the illustrated embodiment, the extension 50 is fastened to the jack saddle 40 by at least partially threading the first extension fastener 53' through the first threaded flange bore 52*a'*, the first pad aperture 43*a*, and the first threaded saddle bore 52*b'*. Likewise, the second extension fastener 55' is at least partially threaded through the second threaded flange bore 54*a'*, the second pad aperture 43*b*, and the second threaded saddle bore 54*b'*. Extension fasteners 53' and 55' may be of different lengths from the extension fasteners 53 and 55. More specifically, the extension fasteners 53', 55' are shorter in length than the extension fasteners 53, 55. Since the extension fasteners 53', 55' are shorter in length, the extension fasteners 53', 55' do not extend to the mounting bracket 30. As shown in FIGS. 3 and 9, extension fasteners 53' and 55' are at least partially threaded through threaded flange bores 52*a'*, 54*a'* and threaded saddle bores 52*b'*, 54*b'*. As shown in FIGS. 2 and 8, extension fasteners 53 and 55 are at least partially threaded through non-threaded flange bores 52*a*, 54*a*, non-threaded saddle bores 52*b*, 54*b*, and threaded mounting bracket bores 52*c*, 54*c*. It is to be understood that the present disclosure contemplates a variety of lengths and a variety of thread patterns (e.g., fully threaded, partially threaded, variable pitch, and variable size) for extension fasteners 53' and 55' and extension fasteners 53 and 55. It is also to be understood that the present disclosure also contemplates an alternative embodiment, in which the first extension bore 52 includes a first non-threaded flange bore 52*a* and a first threaded saddle bore 52*b'*. Similarly, in such an embodiment, the second extension bore 54 includes a second non-threaded flange bore 54*a* and a second threaded saddle bore 54*b'*.

In an alternate embodiment, the at least one extension bore 52, 54 includes a threaded portion bored through the flange 51 (not shown), a non-threaded portion bored through the jack saddle 40, and a threaded portion bored at least partially into the mounting bracket 30. Threading the at least one extension fastener 53, 55 through the threaded flange portion of the extension bore 52, 54 permits free rotation of the at least one extension fastener 53,55 and partial movement along the z-axis. Once the threaded portion of the at least one extension fastener 53, 55 passes through the threading of the threaded flange portion of the extension bore 52, 54, the at least one extension fastener 53, 55 is retained to the flange 51 by the head and the threaded portion of the at least one extension fastener 53, 55. Retaining the at least one extension fastener 53, 55 to the flange 51 is advantageous during storage of the saddle and extension assembly 20 in the storage assembly 10.

A height adjustment mechanism 70 provides a means for a user to adjust the height and the rotation of the extension saddle 60 relative to the flange 51 along the z-axis. An extension saddle pad 63 is disposed on the extension saddle 60 and cushions the extension saddle recess 61*b* for contacting a suitable lifting point on a vehicle (not shown). The extension assembly 20 is fastened to the jack 1 and positioned generally vertically along the z-axis in an extension configuration in order to position the extension saddle 60 at an elevation as close as possible to the lifting point of the vehicle when the lifting arm 3 is in a retracted orientation, thereby maximizing the amount of lift on the vehicle when the handle 5 is actuated to rotate lifting arm 3 to its extended position.

In operation, the extension 50 and the jack saddle 40 are fastened to the mounting bracket 30 of the lifting arm 3. Movement of the handle 5 between up and down positions along the z-axis (for example by pivoting the handle about the y-axis) actuates the lifting arm 3 of the floor jack 1 via the lift cylinder (not shown). The end 6 of the lifting arm 3 is elevated along the z-axis as the lifting arm 3 pivots about pivot points 4*a* and 4*b*. Thus, the saddle and extension assembly 20 engage a suitable lifting point on a vehicle and therefore lift and hold a vehicle in an upper extended position. It is to be understood that the present disclosure contemplates a hydraulic or pneumatic floor jack, a mechanical floor jack, an electrical floor jack, or any other floor jack with suitable lifting means.

Figure 4:
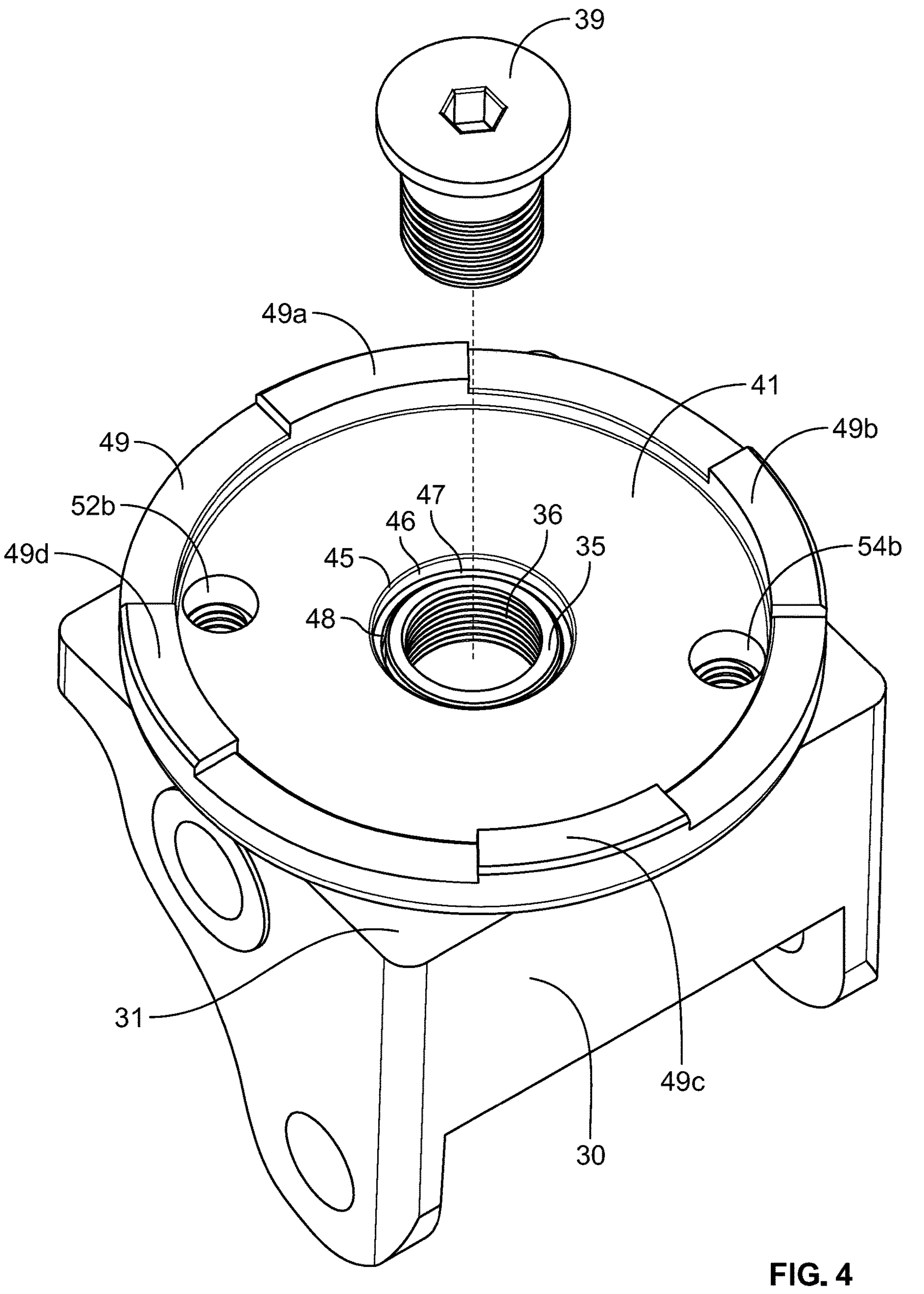
FIG. 4 illustrates a top-front perspective view of a jack saddle disposed on a mounting bracket according to one aspect of the present disclosure.

FIG. 4 illustrates the jack saddle 40 disposed on the mounting bracket 30. In particular, the jack saddle 40 is positioned on a planar surface 31 of mounting bracket 30. The jack saddle 40 includes a recess 41 operable to receive the saddle pad 43 and the extension 50 (or a portion thereof) of the saddle and extension assembly 20. A saddle bore 45 is formed centrally about a central axis of the jack saddle 40 and includes a non-threaded portion 46 bored through the jack saddle 40 and a threaded portion 36 bored at least partially into the mounting bracket 30. The non-threaded portion 46 of the jack saddle 40 includes a saddle fastener recess 47 and a saddle passage 48. The threaded portion 36 is defined by an extended portion 35 that protrudes upwardly along the z-axis and mates with the saddle passage 48 of the jack saddle 40. Saddle fastener 39 is operable to engage with the saddle bore 45 to loosely mount the jack saddle 40 to the mounting bracket 30 of the lifting arm 3. Due to the clearance between the outer surface of the extended portion 35 and the saddle passage 48, as well as the engagement between the head of saddle fastener 39, non-threaded portion 46, and the saddle fastener recess 47, jack saddle 40 is able to rotate about a longitudinal axis of saddle fastener 39 when mounted to the mounting bracket 30 even when the saddle fastener 39 is fastened to threaded portion 36 of the saddle bore 45.

Jack saddle 40 further includes a circumferential saddle ridge 49 and a plurality of landings 49*a*, 49*b*, 49*c*, and 49*d* disposed on the circumferential saddle ridge 49. In the preferred embodiment, the circumferential saddle ridge defines a plurality of landings that support the extension 50. In the illustrated embodiment shown in FIG. 4, the plurality of landings comprises four landings that support the extension 50. It is to be understood that the present disclosure contemplates other plurality of landings in for example, a set of three landings, a set of six landings, or any numerical set of landings sufficient to support the extension 50.

Figure 5:
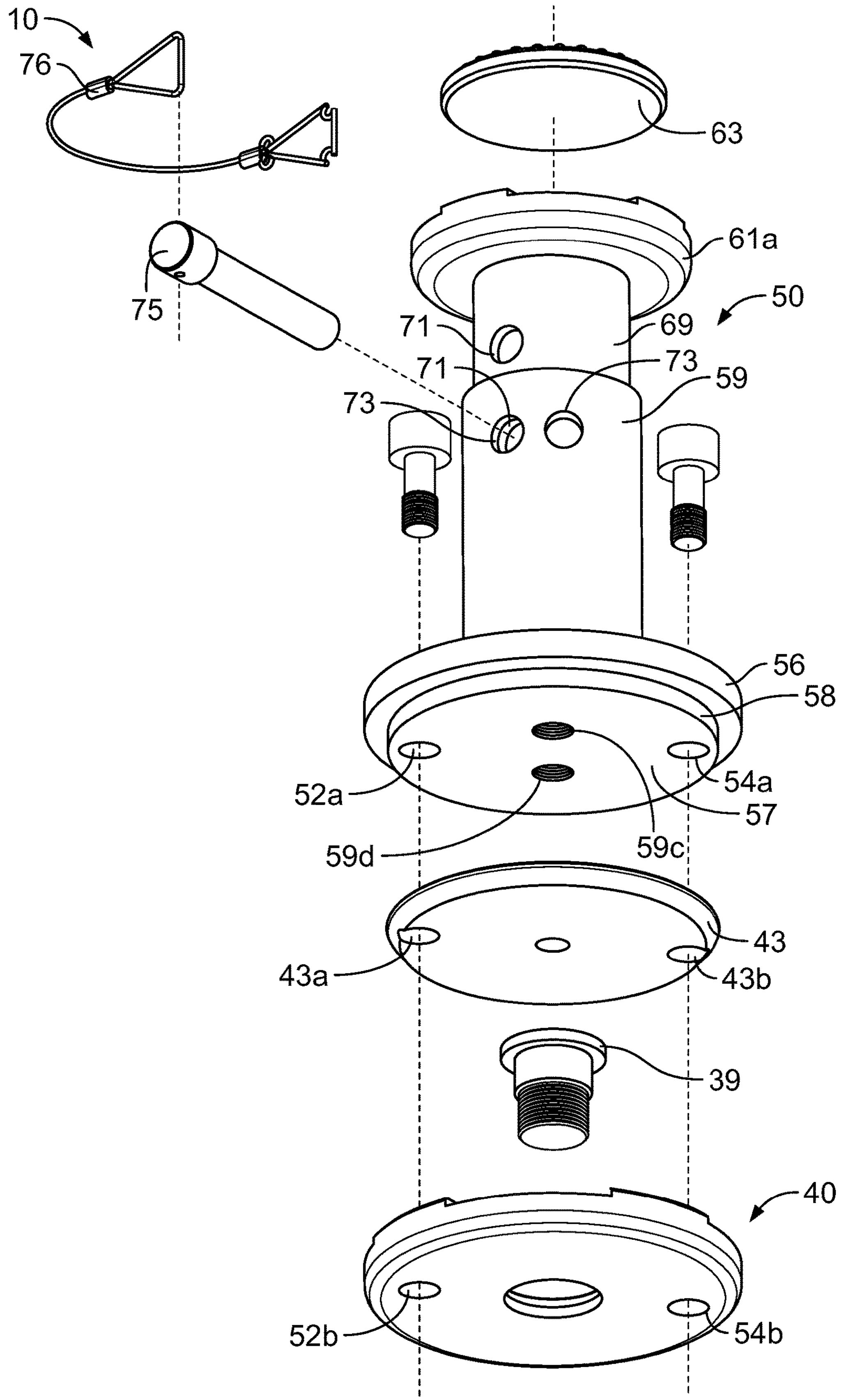
FIG. 5 illustrates a partially exploded, bottom perspective view showing a jack saddle, a jack saddle pad, a flange, an extension saddle, at least one extension fastener, and a height adjustment mechanism according to one aspect of the present disclosure.
Figure 6:
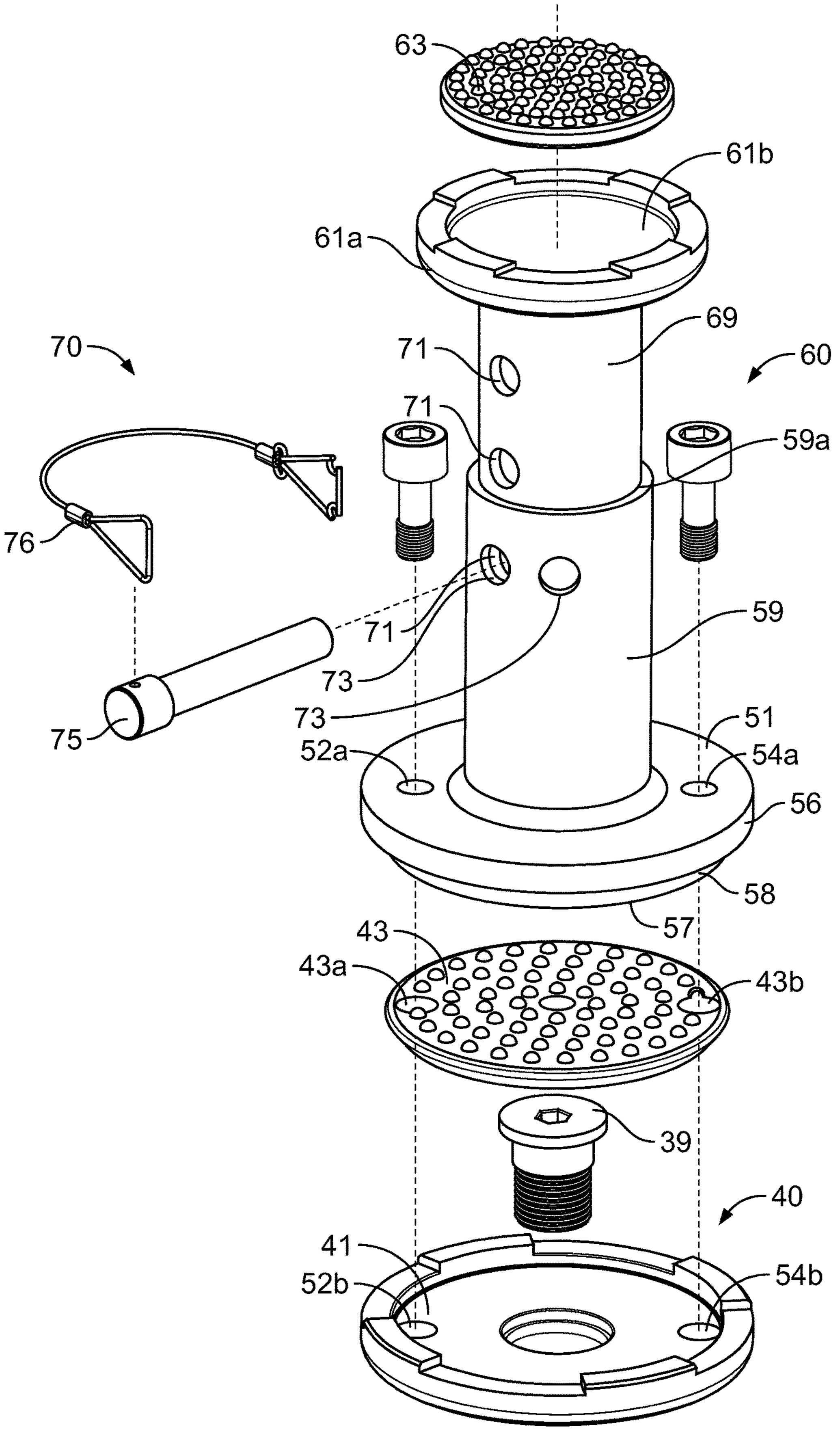
FIG. 6 illustrates a partially exploded, top perspective view showing a jack saddle, a jack saddle pad, a flange, an extension saddle, at least one extension fastener, and a height adjustment mechanism according to one aspect of the present disclosure.

As shown in FIGS. 5 and 6, the extension 50 includes a raised face 57 on a bottom portion 56 of the flange 51. The raised face 57 extends downwardly from the bottom portion 56 along the z-axis and defines a circumferential rim 58 of the flange 51. The recess 41 of the jack saddle 40 is operable to receive the raised face 57 of the flange 51 in tight-fit engagement. In the preferred embodiment, the extension 50 includes a flange, an extension saddle, and a shaft disposed between the flange and the extension saddle. The shaft may be of any suitable length and may optionally be extendable. In the illustrated embodiment shown in FIGS. 5 and 6, the flange 51 comprises a bottom portion 56 and a first telescoping member 59 dimensioned and configured to be closely received with a second telescoping member 69 of the extension saddle 60. As shown, the first telescoping member 59 extends upwardly along the z-axis at a predetermined length. The extension saddle 60 comprises a top portion 61*a* that defines an extension saddle recess 61*b* that receives the extension saddle pad 63 suitable for engaging with a suitable lift point on a vehicle (not shown). The extension saddle 60 also comprises a second telescoping member 69 extending downwardly along the z-axis at a predetermined length. The second telescoping member 69 may be hollow or solid. The passage 59*a* (also labeled in FIGS. 8 and 9) of the first telescoping member 59 has a diameter that is greater than an outer diameter of the second telescoping member 69, such that the second telescoping member 69 can be inserted into and received in the first telescoping member 59. It is to be understood that the sizes and dimensions of the first telescoping member 59 and the second telescoping member 69 shown in the figures are not limiting and that the predetermined lengths of the first telescoping member 59 and second telescoping member 69 may be any suitable length sufficient to lift and a hold a vehicle with higher ground clearance.

Figure 7:
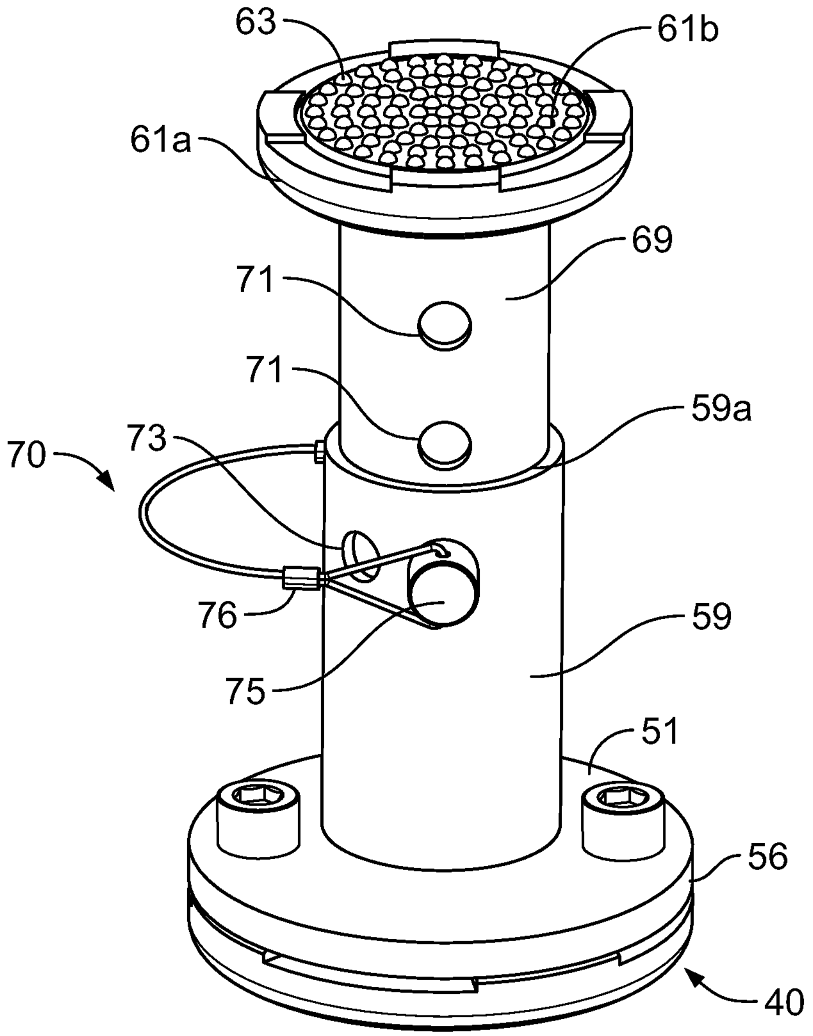
FIG. 7 illustrates a top perspective view of an assembled saddle and extension assembly showing a jack saddle, a jack saddle pad, a flange, an extension saddle, at least one extension fastener, and a height adjustment mechanism according to one aspect of the present disclosure.

As shown in FIGS. 5 through 9, the first telescoping member 59 includes a plurality of holes 73 defined and spaced radially apart on one side of the first telescoping member 59 and a coinciding second plurality of holes 74 on an opposing side (as best seen in FIGS. 8 and 9) of the first telescoping member 59. Similarly, the second telescoping member 69 defines a plurality of holes 71 spaced apart in a longitudinal direction on one side and a coinciding second plurality of holes 72 on the opposing side. The holes 71, 72, 73, and 74 are positioned and dimensioned such that a selected pair of coinciding holes 71, 72 may be selectively aligned with a selected pair of coinciding holes 73, 74 in order to receive a pin 75. Insertion of pin 75 through a selected pair of coinciding holes 71, 72 and 73, 74 fixes the relative disposition of the first and second telescoping members 59, 69 to a certain length and rotational position of the extension 50. As shown in FIGS. 5 and 6, the extension saddle 60 may be locked in multiple height positions relative to the flange 51. As shown in FIGS. 6 and 7, the second telescoping member 69 may be rotated within the first telescoping member 59 about the z-axis such that the extension saddle 60 may be locked in multiple rotational positions relative to the flange 51. The pin 75 of the height adjustment mechanism 70 may further include spring clip 76 or may be any suitable pin, such as a clevis pin, hitch pin, lock pin, or cotter pin.

FIG. 8 illustrates the extension 50 and the jack saddle 40 secured to the mounting bracket 30 such that any axial, lateral, or rotational movement between the flange 51 and the jack saddle 40 and/or failure of the saddle and extension assembly 20 is essentially eliminated when exposed to off-center loading conditions. In particular, as shown in FIG. 8, the jack saddle 40 is mounted on the mounting bracket 30 whereby an extended portion 35 of the mounting bracket 30 engages with the saddle passage 48 of the jack saddle 40. The saddle fastener 39 secures the jack saddle 40 to the mounting bracket 30 via a head 39*a* that engages with the saddle fastener recess 47 of the jack saddle 40 and a threaded shaft 39*b* that engages with a threaded portion 36 of the mounting bracket 30. A cavity 39*c* disposed within the saddle fastener 39 is capable of receiving a tool of corresponding shape to tighten or loosen the saddle fastener 39. When the jack saddle 40 is secured to the mounting bracket 30, the top of the head 39*a* of the saddle fastener 39 is co-planar with the recess 41 of the jack saddle 40. A saddle pad 43 is disposed within the recess 41 of the jack saddle 40 and on top of the head 39*a* of the saddle fastener 39. As discussed above, the saddle pad 43 further includes a first pad aperture 43*a*, a second pad aperture 43*b* for receiving the extension fasteners 53, 55, respectively, therethrough. It will be understood that with the extension fasteners 53,55 secured through the extension flange 51, the saddle 40, and the mounting bracket 30, the saddle fastener 39 may be excluded without significant impact. Further, it will be understood that while not illustrated, the extension 50 may be mounted directly to the mounting bracket 30 without interposing the saddle 40 therebetween. Further, also not illustrated, it will be understood that the extension 50 may be provided with a centrally-positioned threaded bore similar to the saddle bore 45 (see FIG. 4) such that the extension may be mounted directly to the mounting bracket 30.

FIG. 9 illustrates the extension 50 secured to the jack saddle 40 such that any axial, lateral, or rotational movement between the flange 51 and the jack saddle 40 and/or failure of the jack saddle 40 and extension assembly 20 is essentially eliminated when exposed to off-center loading conditions. As shown in FIG. 9, saddle fastener 39 secures the jack saddle 40 to the mounting bracket 30 in the same configuration shown in FIG. 8 wherein the head 39*a* engages with the saddle fastener recess 47 of the jack saddle 40 and the threaded shaft 39*b* engages with the threaded portion 36 of the mounting bracket 30. Saddle pad 43 is similarly, yet optionally, disposed within the recess 41 of the jack saddle 40 and on top of the head 39*a* of the saddle fastener 39. Extension fastener 53' is received in the first extension bore 52 and threadably engages the first threaded flange bore 52*a'* and first threaded saddle bore 52*b'*. Likewise, extension fastener 55' is received in the second extension bore 54 and threadably engages the second threaded flange bore 54*a'* and second threaded saddle bore 54*b'*. When extension fasteners 53', 55' are threaded through the first and second extension bores 52, 54, and saddle fastener 39 is fastened to threaded portion 36 of the saddle bore 45, movement of the extension 50 on the jack saddle 40 is essentially eliminated. Due to the length of extension fasteners 53' and 55', these fasteners are at least partially threaded through threaded flange bores 52*a'*, 54*a'* and threaded saddle bores 52*b'*, 54*b'*, and do not threadably engage threaded mounting bracket bores 52*c*, 54*c*. Saddle bores 52*b'*, 54*b'*, however, are through openings. Extension fasteners 53' and 55' (shown in FIG. 9) are therefore shorter than extension fasteners 53 and 55 (shown in FIG. 8), which are at least partially threaded through non-threaded flange bores 52*a*, 54*a*, non-threaded saddle bores 52*b*, 54*b*, and threaded mounting bracket bores 52*c*, 54 *c*. Because extension fasteners 53', 55' do not extend through the threaded mounting bracket bores 52*c*, 54*c* shown in FIG. 9, jack saddle 40 may rotate about a longitudinal axis of saddle fastener 39. When saddle fastener 39 secures the jack saddle 40 to the mounting bracket 30, axial and lateral movement of the jack saddle 40 is essentially eliminated. In an alternative embodiment, extension fasteners 53', 55' are partially threaded. In this embodiment, a smooth shaft of the extension fastener 53' freely rotates within the first threaded flange bore 52*a'* or first non-threaded flange bore 52*a*, and the distal threaded portion threadably engages the first threaded saddle bore 52*b'*. Similarly, a smooth shaft of the extension fastener 55' freely rotates within the second threaded flange bore 54*a'* or second non-threaded flange bore 54*a*, and the distal threaded portion threadably engages the second threaded saddle bore 54*b'*. It is to be understood that the present disclosure contemplates a saddle and extension assembly 20 that includes a mounting bracket 30 wherein the threaded mounting bracket bores 52*c*, 54*c* shown in FIGS. 2, 3, 4, 8, and 9 are not present. In this embodiment, partially or fully threaded extension fasteners 53 and 55 and/or 53' and 55' threadably engage threaded flange bores 52*a'*, 54*a'* or non-threaded flange bores 52*a*, 54*a*, and threaded saddle bores 52*b'*, 54*b'*, respectively.

Figure 10:
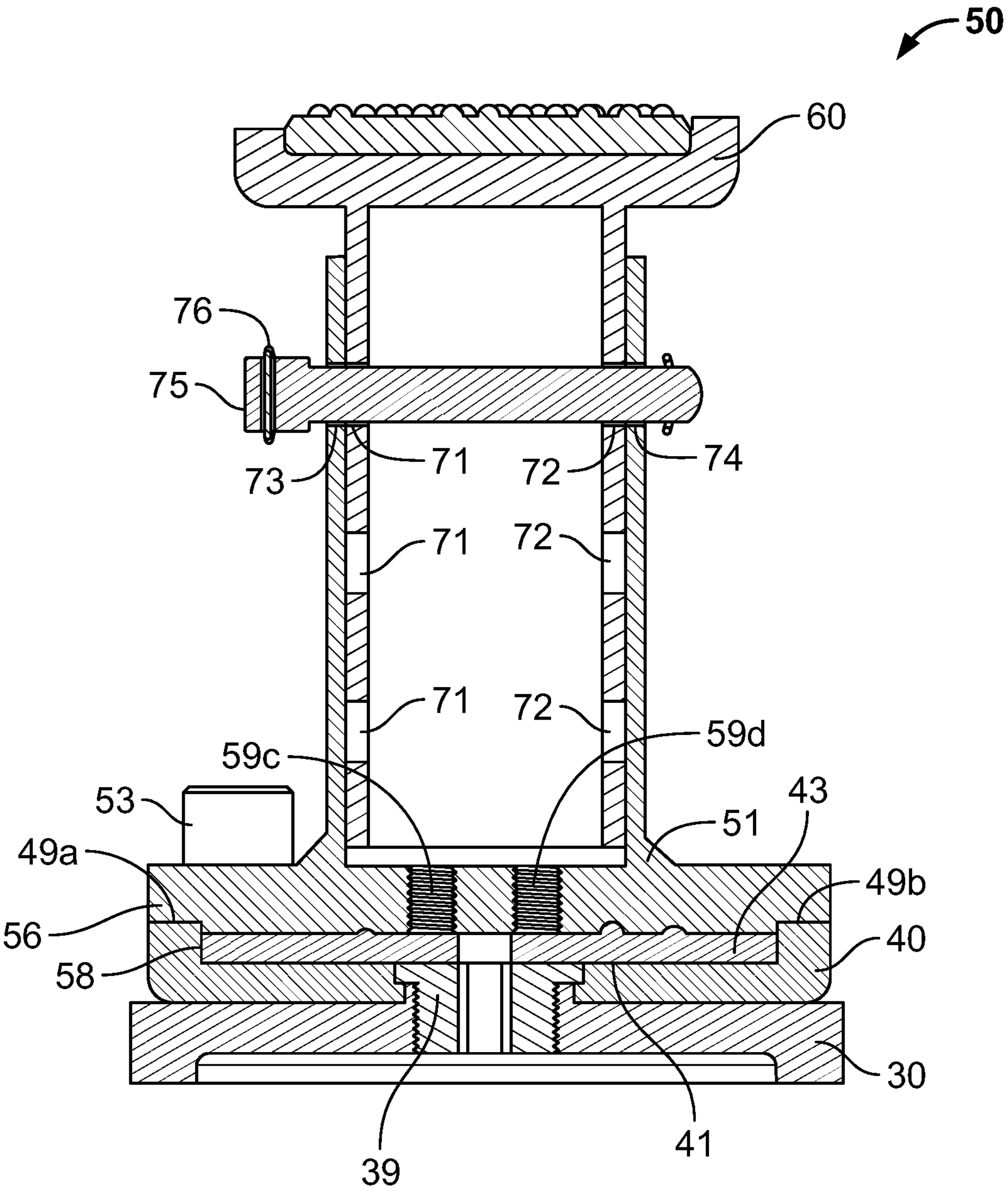
FIG. 10 illustrates a cross-sectional view of an assembled saddle and extension assembly according to multiple aspects of the present disclosure taken along lines 10-10 of FIG. 1.

FIG. 10 illustrates the flange 51 of the extension saddle 50 mated with the jack saddle 40. As shown, the recess 41 of the jack saddle 40 is operable to receive the saddle pad 43 and the raised face 57 of the flange 51 in tight-fit engagement. Specifically, the bottom portion 56 of the flange 51 rests on the plurality of landings (e.g., 49*a*, 49*b*, 49*c*, and 49*d*) and the circumferential rim of the flange 58 communicates with the inner walls of the plurality of landings (e.g., 49*a*, 49*b*, 49*c*, and 49*d*). In addition to the extension 50 being fastened to the jack saddle 40 and the mounting bracket 30 by the least one extension fastener, the engagement between the geometries of the jack saddle 40 and the flange 51 as described above further prevents failure of the saddle and extension assembly 20 when lifting and holding a vehicle.

FIG. 10 further illustrates the alignment of the holes 73,74 defined in the first telescoping member 59 in alignment with one of the three illustrated pairs of holes 71,72 defined in the second telescoping member 69. Further illustrated is the pin 75 inserted through the holes 71,72,73,74 and being selectively retained therein by the spring clip 76.

Figure 11:
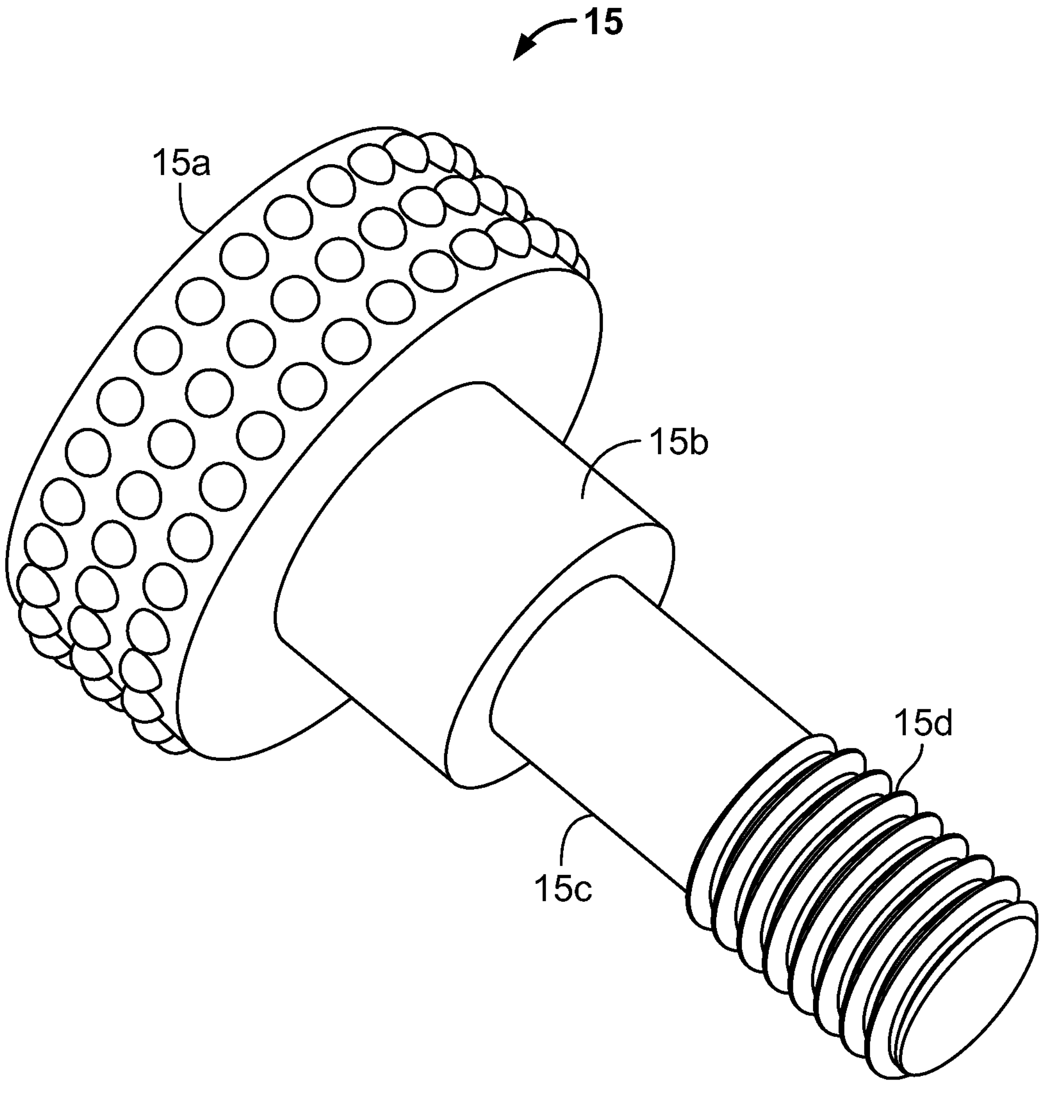
FIG. 11 illustrates a bottom perspective view of a storage fastener according to one aspect of the present disclosure.

As shown in FIG. 11, the storage fastener 15 includes a head 15*a* and a shoulder 15*b*. In the illustrated embodiment, storage fastener 15 further includes a smooth shank 15*c* and a threaded portion 15*d*. Threaded portion 15*d* of storage fastener 15 is operable to engage with the at least one of the threaded storage bores 59*c*, 59*d* (as shown in FIGS. 5, 8, 9, and 10) to releasably secure the extension 50 to the body 2 of the floor jack 1. In an alternate embodiment, the storage fastener 15 is fully threaded.

Figure 12:
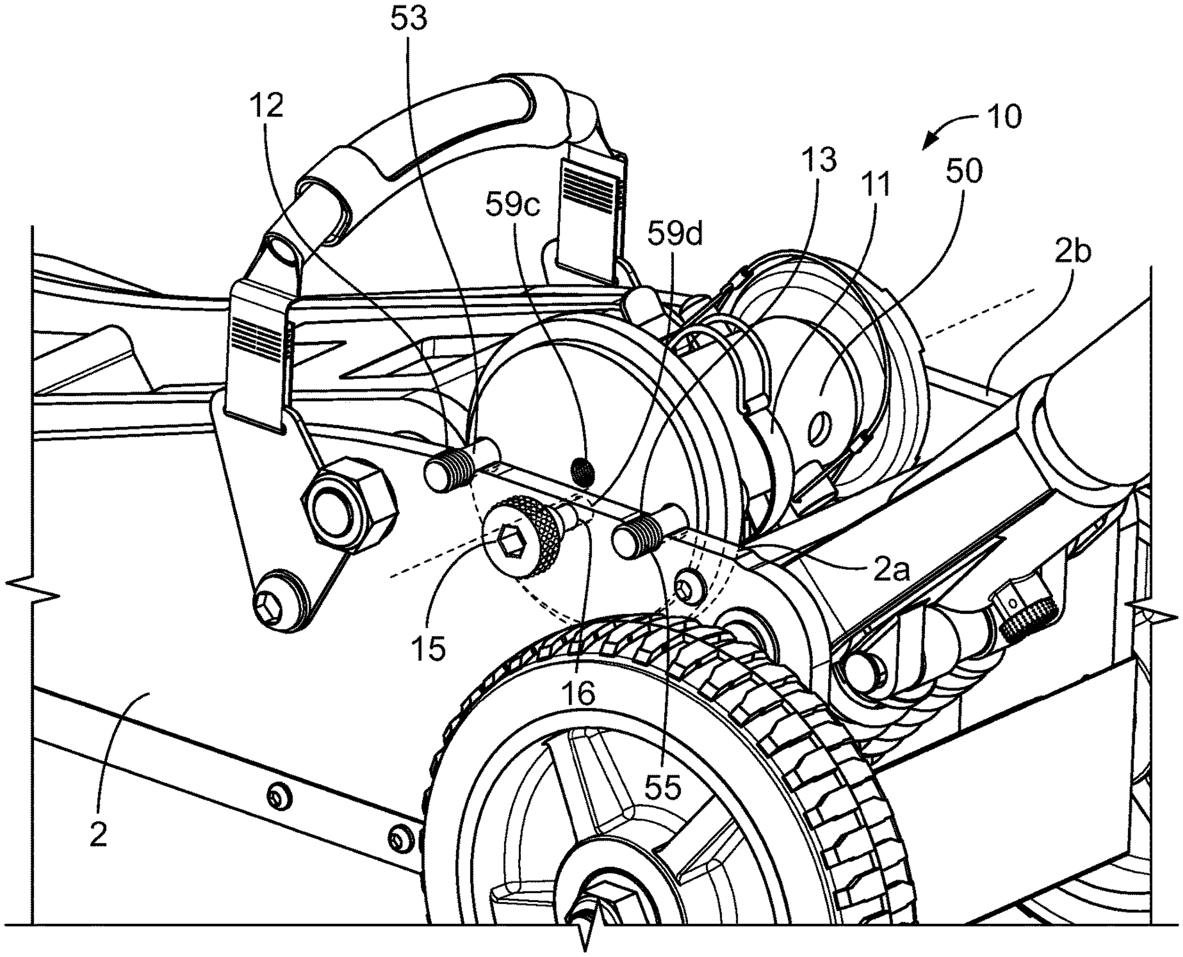
FIG. 12 illustrates a top perspective view of a storage assembly disposed on a floor jack with an extension in a stored configuration according to another aspect of the present disclosure.
Figure 13:
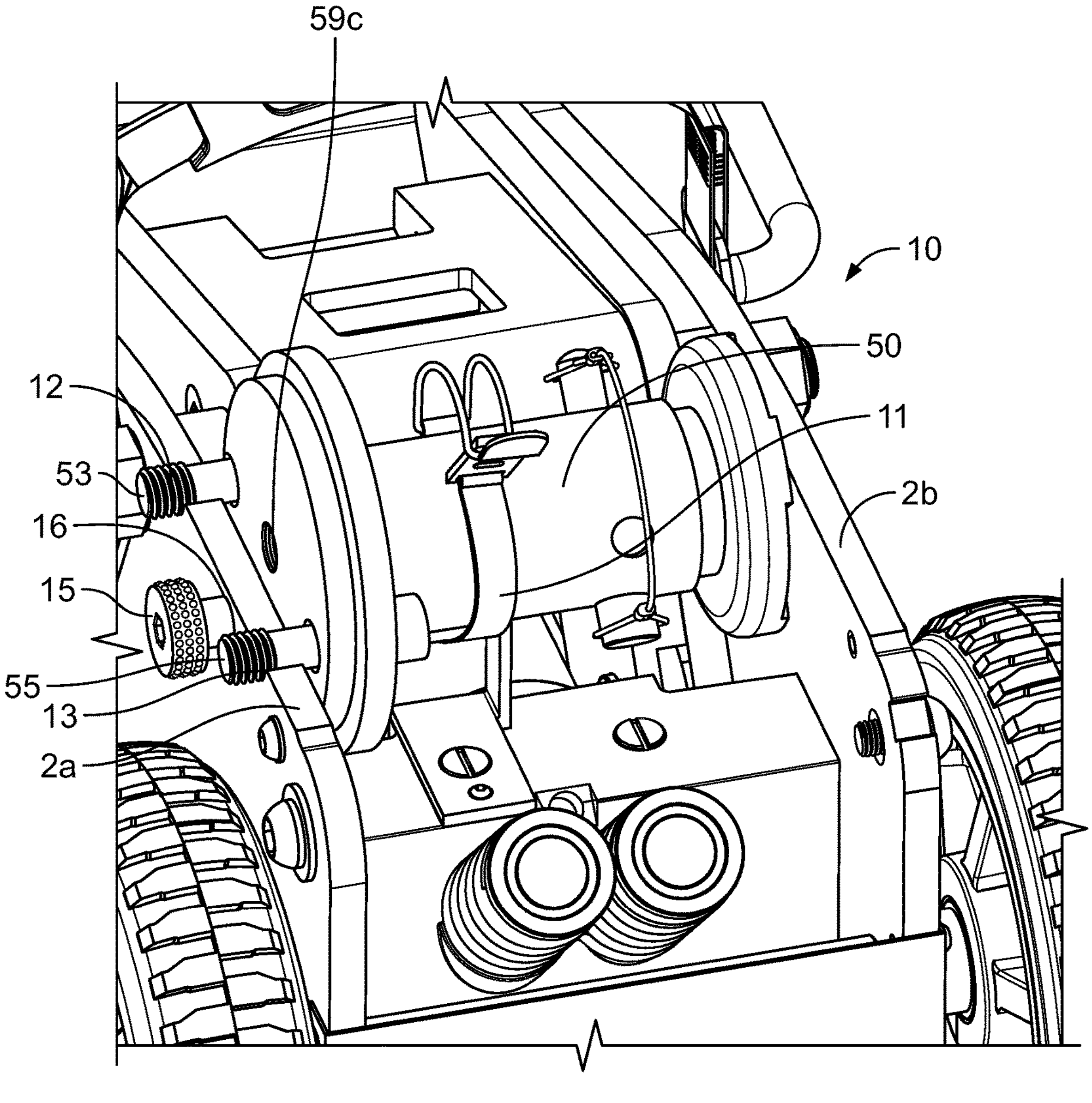
FIG. 13 illustrates a top-rear perspective view of a storage assembly disposed on a floor jack with an extension in a stored configuration according to another aspect of the present disclosure.

The present disclosure contemplates that the extension 50 of the saddle and extension assembly 20 can be removed from the extension configuration. When storage of the removable extension 50 is desirable, a storage assembly 10 is provided to store the removable extension 50 on the body 2 of the floor jack 1 in a stored configuration, generally horizontally along the y-axis. As shown in FIGS. 12 and 13, the storage assembly 10 is disposed on the body 2 of the floor jack 1 whereby the removable extension 50 is stored in generally horizontal position between side 2*a* and side 2*b* of the body 2. In the preferred embodiment, the storage assembly 10 comprises a threaded body bore 16 to receive the storage fastener 15 and at least one notch formed into a side of the body 2 wherein the at least one notch is operable to receive a portion of the at least one extension fastener 53, 55. The storage assembly also comprises a storage clamp bracket 11 mounted on the body 2 and operable to releasably secure the removable extension 50 to the body 2. In the illustrated embodiment shown in FIG. 12, the at least one notch includes a first notch 12 formed into side 2*a* of the body 2 and a second notch 13 formed into side 2*a* of the body 2. The first notch 12 is operable to receive a portion of the first extension fastener 53 and the second notch 13 is operable to receive a portion of the second extension fastener 55. As shown in FIG. 12, the storage clamp bracket 11 releasably secures the removable extension 50 to the body 2.

As discussed above regarding FIG. 11, the removable extension 50 includes at least one threaded storage bore 59*c*, 59*d* formed centrally on the flange 51 wherein the storage fastener 15 is operable to engage with the at least one of the threaded storage bores 59*c*, 59*d* to releasably secure the removable extension 50 to the body 2 of the floor jack 1. As shown in the illustrated embodiment of FIGS. 12 and 13, the at least one threaded storage bore comprises a first threaded storage bore 59*c* formed off-center a central axis of the flange 51 and a second threaded storage bore 59*d* formed off-center a central axis of the flange 51. In such an embodiment, the storage fastener 15 is threaded through the threaded body bore 16 and is operable to engage with the first threaded storage bore 59*c* or the second threaded storage bore 59*d* to releasably secure the removable extension 50 to the body 2 in a stored configuration. Thus, the first threaded storage bore 59*c* and the second threaded storage bore 59*d* are positioned off-center relative to the central axis of the removable extension 50 to prevent rotation of the removable extension 50 about the central axis when secured by the storage fastener 15 and storage clamp bracket 11 in the stored configuration. Additionally, threading the storage fastener 15 through the threaded body bore 16 permits free rotation of the storage fastener 15 and partial movement along the y-axis. Once the threaded portion 15*d* of the storage fastener 15 passes through the threading of the threaded body bore 16, the storage fastener 15 is retained to the side 2*a* of the body 2 by the shoulder 15*b* and the threaded portion 15*d*. Retaining the storage fastener 15 to the side 2*a* of the body 2 is advantageous during operation of the removable extension 50 in the extension configuration. In other embodiments, the threaded body bore 16, the first threaded storage bore 59*c*, and the second threaded storage bore 59*d* may be non-threaded.

Figure 14:
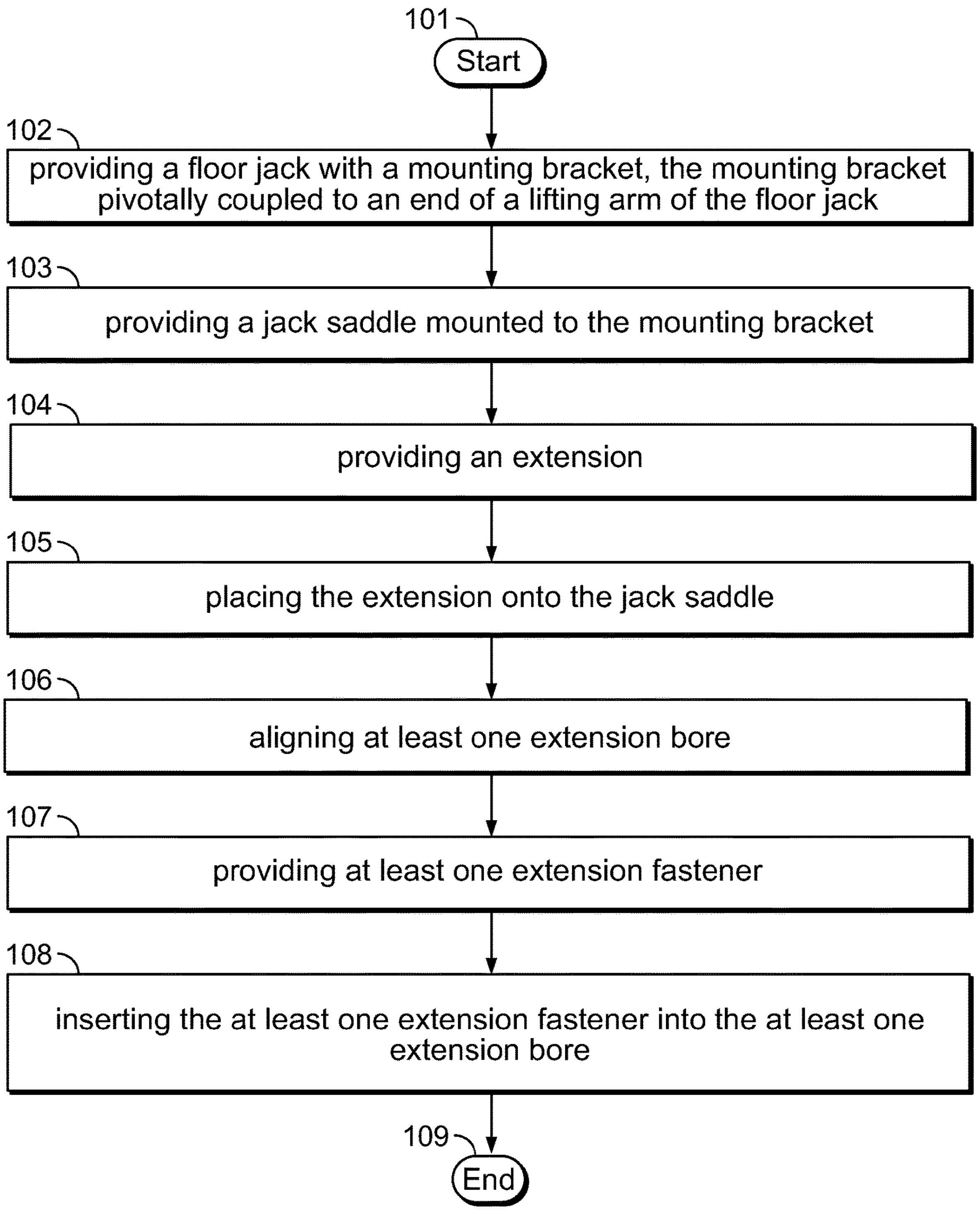
FIG. 14 is a flow chart illustrating example steps for attaching a saddle and removable assembly onto a floor jack, in accordance with aspects of this disclosure.

It is to be understood that the present disclosure also contemplates a method of attaching a saddle and removable assembly 20 onto a floor jack 1. Referring to FIG. 14, the example method steps may start at step 101. At step 102, the method comprises providing a floor jack 1 with a mounting bracket 30 that is pivotally coupled an end of a lifting arm 3 of the floor jack 1 at pivot points 4*a* and 4*b*. At step 103, a jack saddle 40 is mounted to the mounting bracket 30. In the Illustrated embodiment, the jack saddle 40 includes a recessed portion 41 and is secured to the mounting bracket 30 by the threaded engagement of the saddle fastener 39 and the threaded portion of the saddle bore 45. At step 104, an extension 50 is provided. In the illustrated embodiment, the extension 50 includes a flange 51, an extension saddle 60, a shaft 69 disposed between the flange 51 and the extension saddle 60, and a raised face 57 on a bottom portion 56 of the flange 51. At step 105, the method also comprises placing the extension 50 onto the jack saddle 40. In the illustrated embodiment, the extension 50 is placed onto the jack saddle 40 such that the raised face 57 nests within the recessed portion 41 of the jack saddle 40. The method optionally comprises placing a jack saddle pad 43 within the recessed portion 41 of the jack saddle 40 and under the flange 51 of the extension 50. Further, the method optionally comprises placing an extension saddle pad 63 within a recess of the extension saddle 60.

At step 106, the method further comprises aligning at least one extension bore. In the one embodiment, the at least one extension bore includes a non-threaded portion bored through the flange 51 and the jack saddle 40 and a threaded portion bored at least partially into the mounting bracket 30. In another embodiment, the at least one extension bore includes a threaded portion bored through the flange 51 and the jack saddle 40. At step 107, the method further comprises providing at least one extension fastener. At step 108, the method further comprises inserting the at least one extension fastener into the at least one extension bore. In one embodiment, the at least one extension fastener is inserted through the at least one extension bore such that the at least one extension fastener engages the threaded portion to fasten the extension 50 to the jack saddle 40 and the mounting bracket 30 of the lifting arm 3. In another embodiment, the at least one extension fastener is inserted through the at least one extension bore such that the at least one extension fastener engages the threaded portion to fasten the extension 50 to the jack saddle 40. The example steps may proceed to the end step 109. It is to be understood that the present disclosure is not limited to the specific order of steps 101 to 109.

The method may also comprise providing at least one extension bore, such as first extension bore 52 and second extension bore 54, and providing at least one extension fastener, such as first extension fastener 53 and second extension fastener 55 (as shown for example in FIG. 1). The method comprises inserting the first extension fastener 53 into the first extension bore 52 and engaging the first extension fastener 53 with the threaded portion of the first extension bore 52. The method also comprises inserting a second extension fastener 55 into the second extension bore 54 and engaging the second extension fastener 55 with the threaded portion of the second extension bore 54.

The method further comprises adjusting a height-adjustment mechanism 70 on the extension 50 so that the extension saddle 60 contacts a suitable lifting point of a vehicle with higher ground clearance. The height-adjustment mechanism 70 is operable to adjust the height and rotation of the extension saddle 60 relative to the flange 51 in multiple heightened and rotational positions by the engagement of the pin 75 through some of the plurality of extension saddle holes and some of the plurality of flange holes. The method also comprises removing the extension 50 from a storage assembly 10, the storage assembly 10 operable to store the extension 50 on a body 2 of the floor jack 1 in a stored configuration. Additionally, the method comprises returning the extension 50 the storage assembly 10 in the stored configuration.

The present described disclosure is described in such full, clear, concise, and exact terms as to enable any person skilled in the art to which it pertains to practice the same. It is to be understood that the foregoing described preferred aspects of the disclosure and that modification may be made therein without departing from the spirit of scope of the disclosure as set forth in the appended claims. The scope of the following claims is to be accorded the broadest interpretation to encompass all such modifications and equivalent structures and functions. Therefore, it is intended that the application not be limited to the particular aspects disclosed, but that the application will include all aspects falling within the scope of the appended claims.

What is claimed:

1. A method of attaching an extension assembly and an extension saddle onto a floor jack, comprising:

providing the floor jack with a mounting bracket, the mounting bracket pivotally coupled to an end of a lifting arm of the floor jack;

providing a jack saddle mounted to the mounting bracket;

providing the extension assembly;

placing the extension assembly onto the jack saddle;

aligning at least one extension bore;

providing at least one extension fastener;

inserting the at least one extension fastener into the at least one extension bore; and adjusting a height adjustment mechanism on the extension assembly, the height-adjustment mechanism being operable to adjust a height and a rotation of the extension saddle relative to a flange of the extension assembly.

2. The method of claim 1, wherein:

the at least one extension bore comprises a first extension bore and a second extension bore, and the at least one extension fastener comprises a first extension fastener and a second extension fastener;

the method further comprising:

inserting the first extension fastener into the first extension bore and engaging the first extension fastener with a threaded portion of the first extension bore; and inserting the second extension fastener into the second extension bore and engaging the second extension fastener with a threaded portion of the second extension bore.

3. The method of claim 1, further comprising:

removing the extension assembly from a storage assembly, the storage assembly operable to store the extension assembly on a body of the floor jack in a stored configuration.

4. The method of claim 3, further comprising:

returning the extension assembly to the stored configuration after use.

* * * * *